(12) United States Patent
Smith et al.

(10) Patent No.: US 8,725,901 B2
(45) Date of Patent: May 13, 2014

(54) ANALYSIS TOOL FOR INTRA-NODE APPLICATION MESSAGING

(75) Inventors: Thomas M. Smith, Westfield, NJ (US);
Gregory W. Bond, Hoboken, NJ (US);
Eric Cheung, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1011 days.

(21) Appl. No.: 12/002,179

(22) Filed: Dec. 14, 2007

(65) Prior Publication Data
US 2009/0157904 A1    Jun. 18, 2009

(51) Int. Cl.
*G06F 13/00*    (2006.01)

(52) U.S. Cl.
USPC ............ 709/246; 709/230; 709/232; 709/206

(58) Field of Classification Search
USPC .................. 709/246, 230, 232, 204–206
See application file for complete search history.

(56) References Cited

U.S. PATENT DOCUMENTS

| | | | |
|---|---|---|---|
| 7,975,059 B2 * | 7/2011 | Wang et al. | 709/230 |
| 2005/0289231 A1 * | 12/2005 | Harada et al. | 709/224 |
| 2007/0112969 A1 * | 5/2007 | Wang et al. | 709/230 |

* cited by examiner

*Primary Examiner* — Kenneth Coulter

(57) ABSTRACT

A method and apparatus for transforming message events between applications running on a computing device into a form that appears as network events between multiple virtual network access devices. These "network events" may then be processed by known network software protocol analyzers.

13 Claims, 5 Drawing Sheets

ANALYSIS TOOL FOR INTRA-NODE APPLICATION MESSAGING

FIELD OF THE INVENTION

The present invention relates generally to computer networking, and more particularly, to a methodology and apparatus for transforming messages communicated between software applications running on a computing device into network events that can be processed by known network software protocol analyzers.

BACKGROUND OF THE INVENTION

Message-based software applications are widely found in domains such as telecommunications. Such applications exchange data through messages to fulfill their desired functions. The applications enable a variety of capabilities, including real-time communications and data transfer. In this connection, a stream of messages between network components can be commonly analyzed by "Software Protocol Analyzers" (SPA) such as Wireshark®, formerly known as Ethereal®, and the like, which are well known in the art. SPAs enable monitoring of network operations, ensure proper network performance, and assist with debugging issues by capturing and analyzing such messages between applications.

Currently deployed SPAs are disposed between hosts communicating through a network as shown in FIG. 1. Thus, they are restricted to analyzing messages between applications that are located on separate hosts. It would therefore be desirable to utilize such standard inter-host tools to analyze message events, which are defined as those events that occur between applications that are running on a single host.

SUMMARY OF THE INVENTION

In accordance with aspects of the present invention, there is disclosed a methodology and apparatus for transforming message events that are created by applications executing on a single computing device into a form that appears analogous to "network events". In a general sense, the method comprises creating a virtual network access device corresponding to each application, logging message events which are communicating between applications running on the computing device, correlating the message events logged by sending and receiving applications with each other, correlating some message events with true network events, and transforming the message events into network events such that the message (i.e., "network events") may be processed by SPAs.

In accordance with another aspect of the invention, a computing device comprising a memory medium embodying machine readable instructions which, when executed by a processor, enable the computing device to create a virtual network access device corresponding to each application, log message events which are communicating between applications running on the computing device, correlate the message events into network events, and transform the message events into network events such that the message (i.e., "network events") may be processed by SPAs.

In accordance with still another aspect of the invention, there is provided a memory medium containing machine readable instructions which, when executed by a processor, enable a computing device to create a virtual network access device corresponding to each application, log message events which are communicating between applications running on the computing device, correlate the message events into network events, and transform the message events into network events such that the message (i.e., "network events") may be processed by SPAs. These and further advantages will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

In accordance with a first aspect of the invention, there is disclosed herein a method for transforming message events that occur between applications running on a computing device such that they appear as network events between "virtual" hosts on a communication network for analysis by standard network messaging software (i.e. Software Protocol Analyzers (SPA)).

Figure 1:
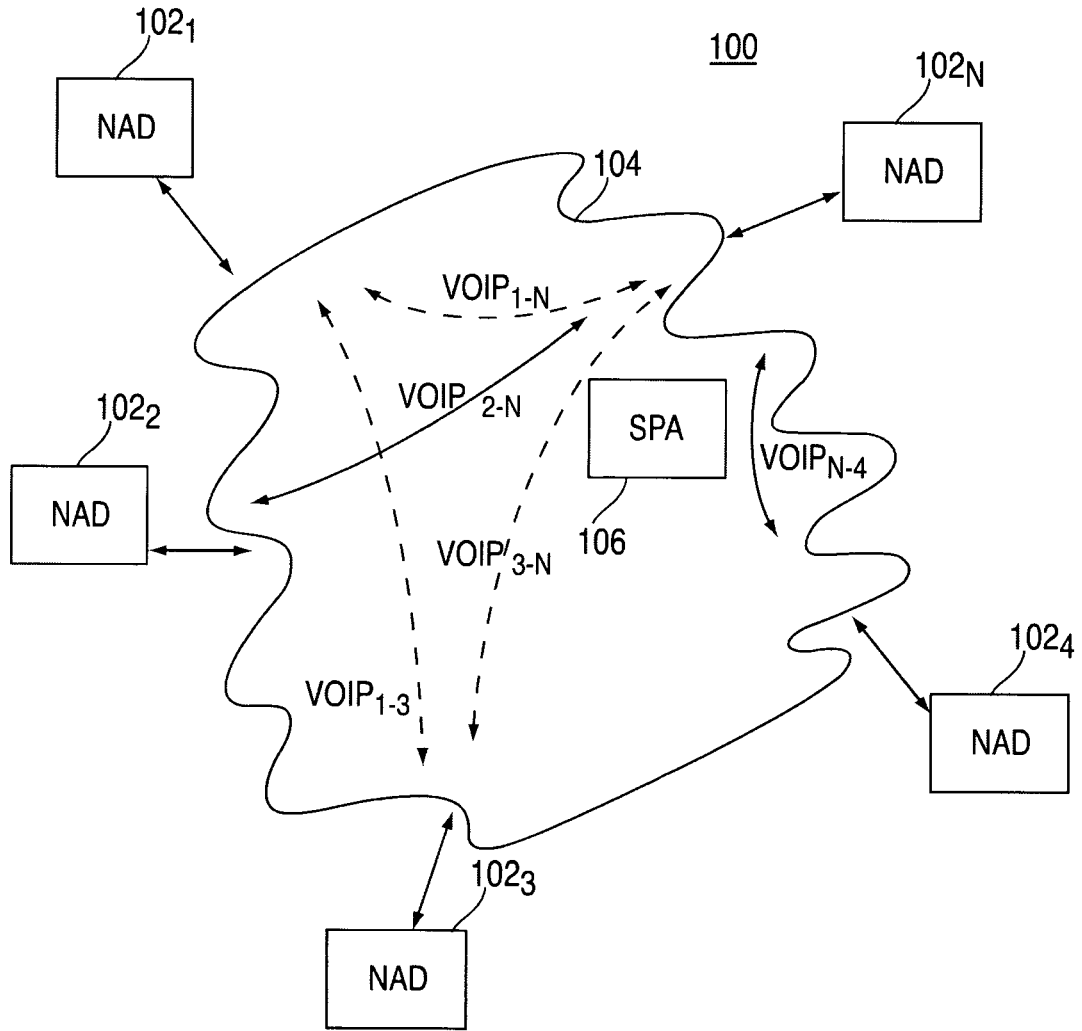
FIG. 1 is an illustrative prior art network architecture comprising a plurality of network access devices (NADs) connected to and communicating over a communications network.

With reference now to FIG. 1, an illustrative network architecture 100 is shown, which generally comprises a plurality of network access devices (NADs): $102_1, 102_2, \ldots 102_N$, which communicate therebetween through a communications network simply characterized by the reference numeral 104. Such networks 104 are well known in the art and, as example, an exemplary Voice over IP (VoIP) application for enabling telephone calls between a plurality of users connected to the network 104 is shown. Examples of NADs include, but are not limited to, a telephone coupled to an access/backbone network providing VoIP services, a personal computer (PC)/laptop and/or a personal digital assistant (PDA) such as a Blackberry®, Palm®, or like apparatus.

Typically a SPA 106 is deployed somewhere in the network (as shown) or in a NAD ($102_1, 102_2, \ldots, 102_N$). The SPA 106 processes and analyzes inter-host messages as described in the foregoing.

Figure 2:
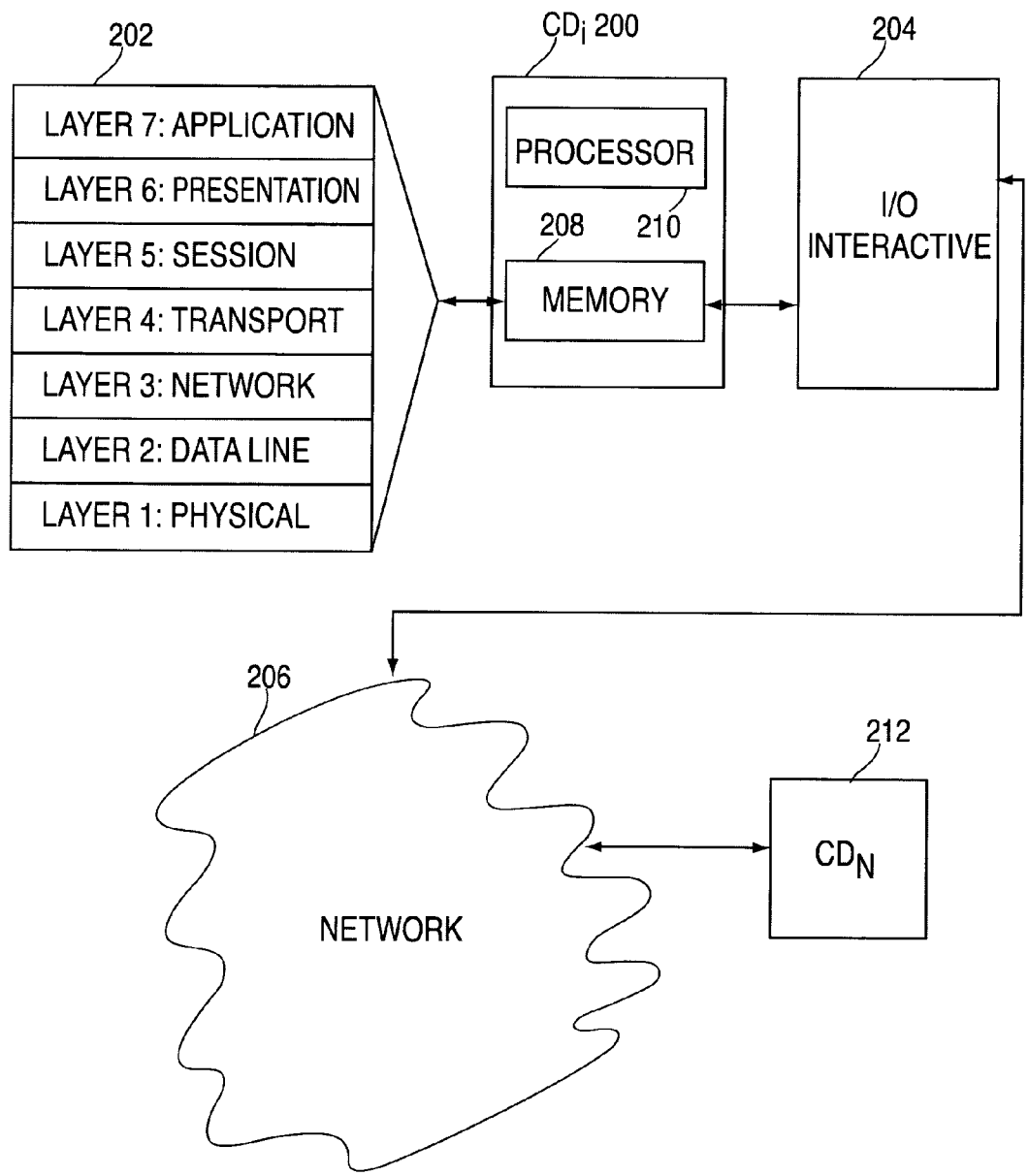
FIG. 2 is a schematic of an exemplary Computing Device (CD) connected to a communications network, showing the Open System Interconnect reference model (OSI Ref. Model) within the CD.

FIG. 2 is a schematic of the Open System Interconnect reference model (OSI Ref. Model) running on an exemplary Computing Device (CD) 200 in a typical network environment. This model was developed by the International Standards Organization (ISO) to standardize communication interfacing between heterogeneous NADs. The OSI model comprises a seven layer configuration, and as is well known in the art of computer networking. In this connection, each layer is a collection of related functions for providing services to a higher contiguous layer, and for receiving services from the lower adjacent layer. The layers of the OSI are defined as follows:

Layer 1: Physical—This layer implements the transfer of data over the physical link, specifically the mechanical, electrical and procedural characteristics to establish, maintain and deactivate the physical link.

Layer 2: Data Link—This layer enables the reliable transfer of data across the physical link of Layer 1. It provides the functional and procedural method to transfer data between CDs and to detect and possibly correct errors that may occur in the Physical layer.

Layer 3: Network—This layer provides the functional and procedural means of transferring data from a source to a destination through a plurality of networks while maintaining data integrity (quality) specified by Layer 4 (Transport layer).

Layer 4: Transport—This layer enables the transfer of data between end users, and provides reliable data transfer services to Layer 5 (Session layer).

Layer 5: Session—This layer establishes a control structure for communication between applications, specifically to establish, manage and deactivate connections (sessions) between applications.

Layer 6: Presentation—This provides a standardized Application Programming Interface (API) and to provide common communications services.

Layer 7: Application—This layer provides services to the end users of the OSI environment. It can provide services such as File Transfer Protocol (FTP), transaction server, network management, etc.

The OSI provides a framework for computer networking from the application layer running programs at the top level for the user, to an input/output (I/O) interface 204 coupled to a communications network 206. In this regards, each layer "messages" the adjacent layer of the model. The $CD_i$ 200 includes conventional memory 208 and a processor 210 as is commonly known in the art. The $CD_i$ 200 here is depicted as bidirectionally communicating with another $CD_N$ 212 over a communications network 206.

In accordance with the present invention, current state of the art methods for handling messages created in known message based applications are restricted to events that occur at layers of the OSI stack below the Application Layer (e.g., at layers 3 and 4). Aspects of this invention provide a methodology for correlating messages generated by independent applications running on a single host, and allow for the generation of a consolidated log of events that may be transformed into a format that can be readily processed by SPAs, either on the host itself or somewhere else on a network. These intra-host messages may never reach the lower layers of the OSI stack required by current state of the art methods. This invention, therefore, allows standard inter-host software tools to be used for processing of such intra-host messages.

Figure 3:
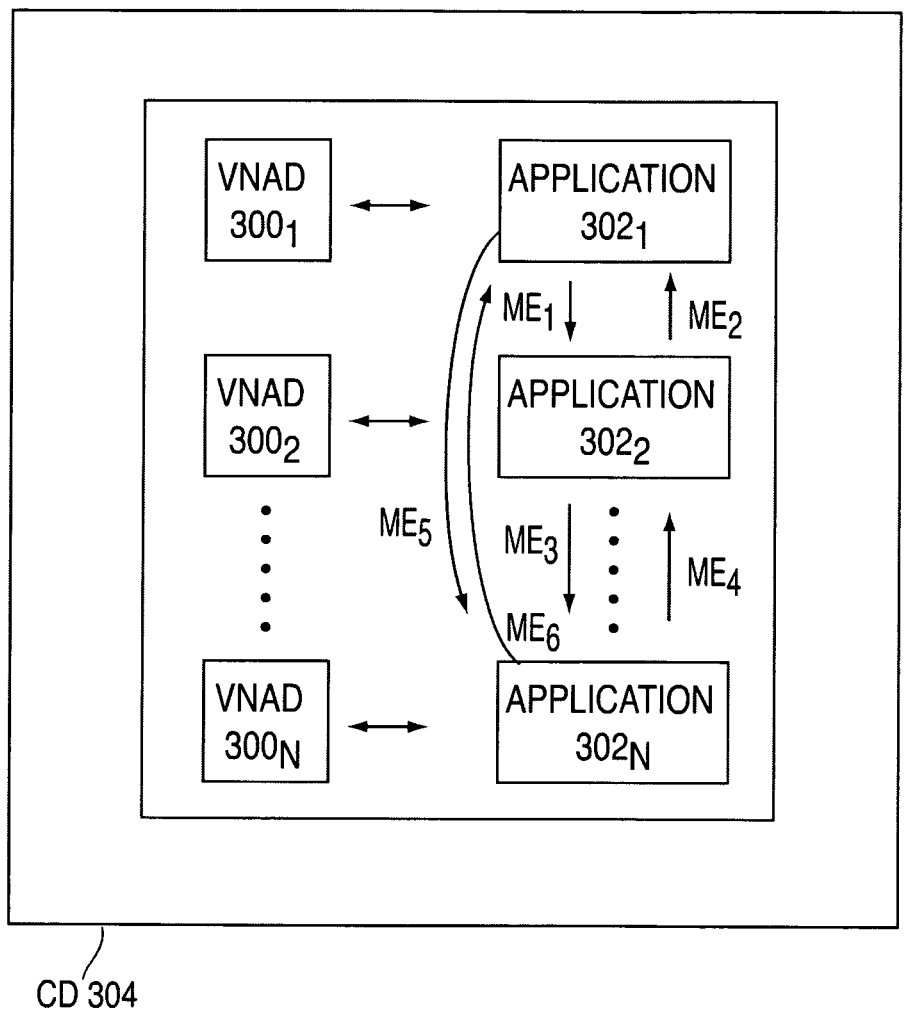
FIG. 3 is a schematic of a CD running a plurality of applications and corresponding virtual network access devices (VNADs) in accordance with an aspect of the invention.

FIG. 3 is a schematic of a Computing Device (CD 304) which is capable of running a plurality of applications, such as, for example those represented at $302_1, 302_2, \ldots, 302_N$. These applications pass messages therebetween as represented by $ME_1, ME_2, \ldots, ME_6$. In accordance with the present invention, each application $302_1, 302_2, \ldots, 302_N$ may be represented by a corresponding Virtual Network Access Device (VNAD): $300_1, 300_2, \ldots, 300_N$. The VNADs $300_1, 300_2, \ldots, 300_N$ may be thought of conceptually as network access devices that communicate over a typical network.

Figure 4:
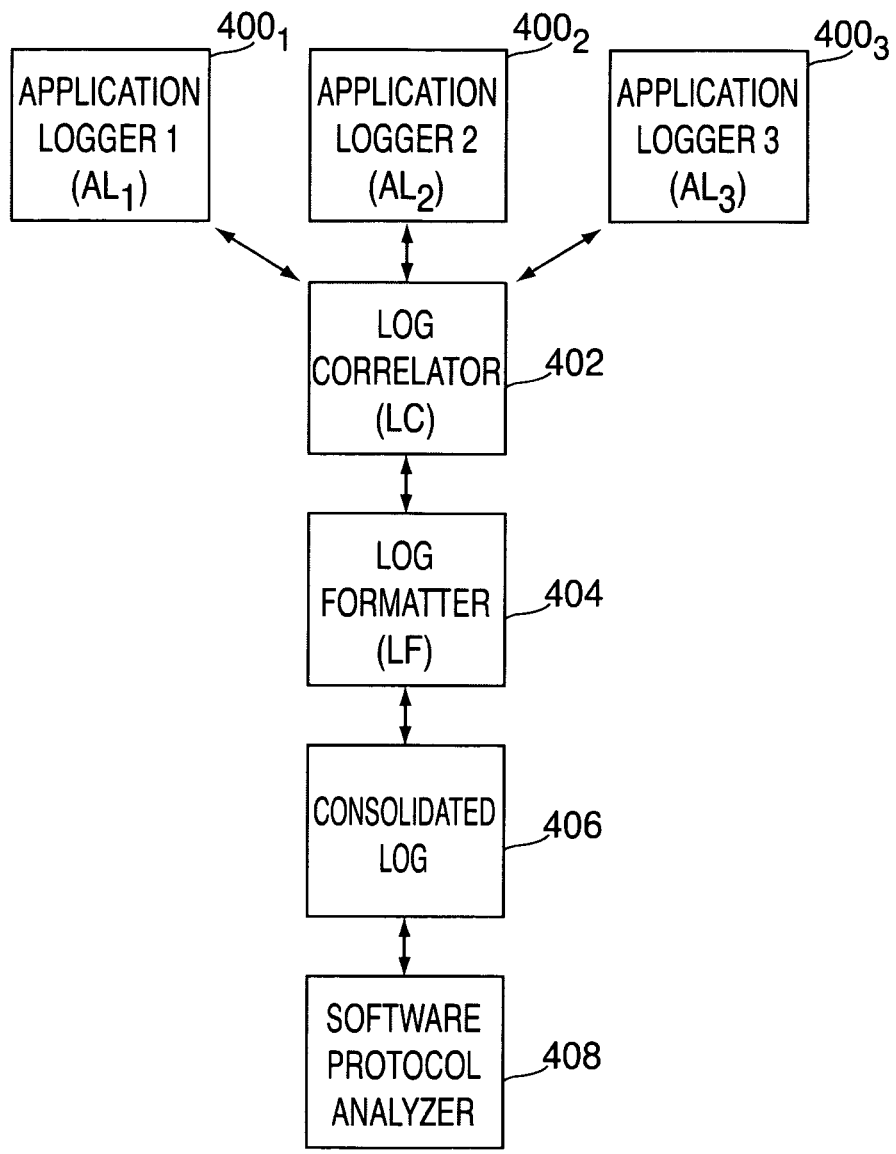
FIG. 4 is a flow diagram depicting a method for correlating, formatting and transforming message events that occur between applications running on the CD into "network events" that may be analyzed by SPAs.

With reference to FIG. 4, an exemplary flow diagram is depicted for practicing a method in accordance with an aspect of the invention. This method employs three components: an Application Logger (AL) 400, a Log Correlator (LC) 402 and a Log Formatter (LF) 404.

The Application Logger (AL) 400 is a software library or module that is used by each application ($AL_1$ $400_1$, $AL_2$ $400_2$, $AL_3$ $400_3$) running on the CD as described above, and intercepts (i.e., "logs") messages that are communicating between applications running on the CD. In a preferred embodiment, the logging function is executed automatically as network events occur, such that the author of the application need not provide such code within new software instructions of each individual application. This arrangement simplifies software development, testing, debugging, deployment, operation, maintenance and computer/networking upgrades.

The Log Correlator (LC) 402 in FIG. 4 is a software component that bidirectionally interfaces with each AL 400 and correlates the logs generated by the AL 400. It analyzes the log files to determine which output events from an application correspond to input events from another application, as well as which message events may correspond to true network events, and then creates consolidated network events to represent such linkages.

The Log Formatter (LF) 404 in FIG. 4 is a software component that bidirectionally interfaces with the LC 402, and operates on the consolidated logs to format the network events into a standard format that can be easily processed by a variety of SPAs. A consolidated log representing all of the network events is shown at 406, which log is thereafter output to a SPA 408.

Figure 5:
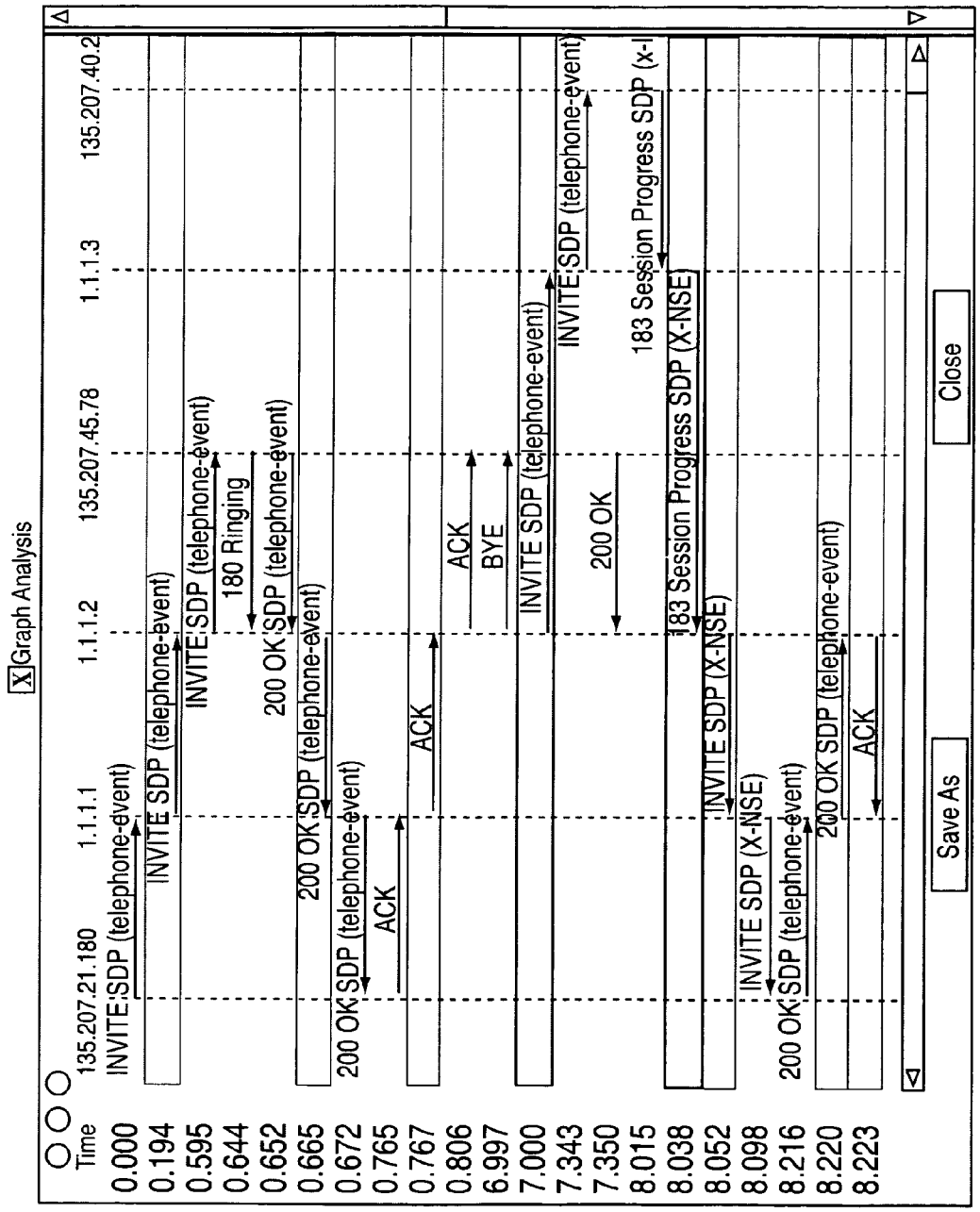
FIG. 5 is an example of an illustrative intra-host messaging scheme in the context of a Voice-over-IP (VoIP) application.

FIG. 5 is a schematic of an exemplary flow diagram showing a timeline of sample message events that might be communicating between applications running on a CD processing a VoIP call. As described above, these intra-host messages may be monitored and transformed into message logs that can be processed by SPAs.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A method of transforming message events into network events, comprising:

creating, via a processor of a single computing device, a virtual network access device corresponding to each application, wherein the message events are generated by applications running on the single computing device, wherein the network events are in a form that appears as between multiple virtual network access devices on the single computing device;

logging, via the processor, messages corresponding to the message events between applications running on the single computing device;

correlating, via the processor, the message events; and transforming, via the processor, the message events into the network events between the virtual network access devices that are processed by a network software protocol analyzer.

2. The method recited in claim 1, further comprising:
generating a log of the network events.

3. The method recited in claim 2, wherein the log is consolidated in a format usable by standard network analysis tools of the network software protocol analyzer.

4. The method recited in claim 1, wherein the logging messages further comprises:
generating logs of the network events in a standard format;
analyzing the logs to determine correspondence between output events between applications executing on the virtual network access devices; and
formatting the network events in a standard format.

5. A single computing device comprising:
a processor; and
a computer readable medium storing a plurality of instructions which, when executed by the processor, cause the processor to perform operation for transforming message events into network events, the operations comprising:
creating a virtual network access device corresponding to each application, wherein the message events are generated by applications running on the single computing device, wherein the network events are in a form that appears as between multiple virtual network access devices on the single computing device;
logging messages corresponding to the message events between applications running on the single computing device;
correlating the message events; and
transforming the message events into the network events between the virtual network access devices that are processed by a network software protocol analyzer.

6. The single computing device of claim 5, to further comprising:
generating a log of the network events.

7. The single computing device of claim 6, wherein the log is consolidated in a format usable by the network software protocol analyzer.

8. The single computing device of claim 5,
wherein the logging messages further comprises:
generating logs of network events in a standard format;
analyzing the logs to determine correspondence between output events between applications executing on the host; and
formatting the network events in a standard format that is utilized by the network software protocol analyzer.

9. A computer readable medium storing a plurality of instructions which, when executed by a processor of a single computing device, cause the processor to perform operations for transforming message events into network events, the operations comprising:
creating a virtual network access device corresponding to each application, wherein the message events are generated by applications running on the single computing device, wherein the network events are in a form that appears as between multiple virtual network access devices on the single computing device;
logging messages corresponding to the message events between applications running on the single computing device;
correlating the message events; and
transforming the message events into the network events between the virtual network access devices that are processed by a network software protocol analyzer.

10. The computer readable medium of claim 9, further comprising:
generating a log of the network events.

11. The computer readable medium of claim 10, wherein the log is consolidated in a format usable by the network software protocol analyzer.

12. The computer readable medium of claim 9, further comprising:
generating logs of network events in a standard format;
analyzing the logs to determine correspondence between output events between applications executing on the virtual network access devices; and
formatting the network events in a standard format.

13. A method of transforming message events into network events, comprising:
creating, via a processor of a single computing device, a virtual network access device corresponding to each application, wherein the message events are generated by applications running between the single computing device and another host communicating with the single computing device over a network, wherein the network events are in a form that appears as between multiple virtual network access devices on the single computing device;
logging, via the processor, messages corresponding to the message events between applications running on the single computing device;
correlating, via the processor, the message events; and
transforming, via the processor, the message events into the network events between the virtual network access devices that are processed by a network software protocol analyzer.

* * * * *